Jan. 27, 1953 E. W. HOLMAN 2,626,992

SIGNAL DELAY DEVICE

Filed Feb. 26, 1949 3 Sheets-Sheet 1

INVENTOR
E. W. HOLMAN
BY H. A. Burgess
ATTORNEY

Jan. 27, 1953 E. W. HOLMAN 2,626,992

SIGNAL DELAY DEVICE

Filed Feb. 26, 1949 3 Sheets-Sheet 2

INVENTOR
E. W. HOLMAN
BY H. A. Burgess
ATTORNEY

INVENTOR
E. W. HOLMAN
BY
H. A. Burgess
ATTORNEY

Patented Jan. 27, 1953

2,626,992

UNITED STATES PATENT OFFICE 2,626,992

SIGNAL DELAY DEVICE

Erwin W. Holman, Summit, N. J., assignor to Bell Telephone Laboratories, Incorporated, New York, N. Y., a corporation of New York Application February 26, 1949, Serial No. 78,503

10 Claims. (Cl. 178—44)

The present invention relates to the construction and use of a transmission delay line comprising a fluid-filled pipe for transmitting mechanical impulses from one end of the line to the opposite end in order to provide a particular time interval of transmission for the pulses.

Such a delay line is useful in many fields of application, such as in signaling systems in which an electrical impulse that is to be delayed is converted to a mechanical impulse at one end of the line and the delayed mechanical impulse at the other end of the line is again transformed into an electrical impulse thus providing a longer delay in the electrical impulse than is feasible by purely electrical circuit means.

The present invention, in common with the application of Herbert J. McSkimin, Serial No. 653,255, filed March 9, 1946, now Patent No. 2,505,364, issued April 25, 1950, provides a relatively long fluid transmission line which for compactness may be folded, with reflecting points at folds. The construction in the present application is in general similar to that disclosed in the McSkimin application, and the theory of propagation of waves and the theoretical analysis and discussion given therein and in the article by H. J. McSkimin entitled "Theoretical Analysis of the Mercury Delay Line" published in the Journal of the Acoustical Society of America, July 1948, are generally applicable to the transmission delay line to be specifically disclosed in this application.

The line to be specifically disclosed herein by way of example is a mercury line twenty-four feet long, in contrast to prior art lines of the order of two to four feet long. A line of this length has a delay time of about 5,000 microseconds. One problem that presents itself in the case of such a long line is the transmission characteristic of the line itself since its attenuation and rate of increase of attenuation with increase of frequency are large enough to become significant in determining the overall transmission characteristic of line plus the terminal transducers, such as piezoelectric crystals.

Another problem that becomes accentuated in the case of such a long line lies in the mechanical difficulty of centering sufficiently accurately the beam upon the transducer at the far end of the line.

The invention comprises among its features such a combination of transducer and transmission line characteristics as will result in the desired overall transmission characteristic, as to both attenuation and band width. A further feature is a type of transducer mounting that will permit of final adjustment in orientation of the transducer element after the line has been completely assembled and filled with mercury or other fluid, so as to enable the best transmission characteristic to be obtained.

A further feature comprises provision for maintaining intimate mechanical contact between the mercury or other fluid and the entire crystal face under all conditions of operation.

Further features have to do with the constructional details of the apparatus, particularly of the mountings for the driving and driven crystals.

While there are many types of liquid filling that can be used in delay lines for the propagation of the waves and the improvements according to this invention are not confined to the use of a particular filling, the description from this point on will be directed to a line having mercury as the medium and with the assumption that a considerable frequency band width is to be transmitted. It will also be assumed in the description that pulses are to be sent through the delay line and that the form of pulses is to be faithfully preserved, requiring the transmission of a sufficiently broad frequency band. Actually, the pulse is transmitted as a modulation of a high frequency carrier wave which may be of the order, for example, of five to ten megacycles.

The invention may be better understood by reference to the drawings in which.

It is to be understood that the embodiments shown are illustrative only of the invention and that other equivalent structure may be used and other materials used within the invention.

Quartz crystal discs (X-cut) are used at both ends of the line for converting between electrical and mechanical energy. These are half a wave-length thick at the fundamental resonant frequency and the surfaces of the crystals in contact with the mercury are highly polished and must be as perfectly clean as possible. No attempt is made to back up these crystals with a mechanical impedance matching that of the crystal. In fact total reflection from the back of the crystal through the crystal and into the mercury reinforces the original waves in phase and gives a six-decibel gain. The attenuation of the line is so high (about 20 decibels) at the operating carrier frequency of 6.5 megacycles that standing waves are maintained sufficiently low not to be troublesome, the reflection from the back of the crystal being 40 decibels down with reference to the transmitted waves.

The reflecting surfaces at the fold points of the line are heavy steel plates. The surfaces of these reflecting plates and the inner surface of the tubes are roughened as in the McSkimin application disclosure to promote reflection by accentuating the impedance mismatch.

Figure 1:
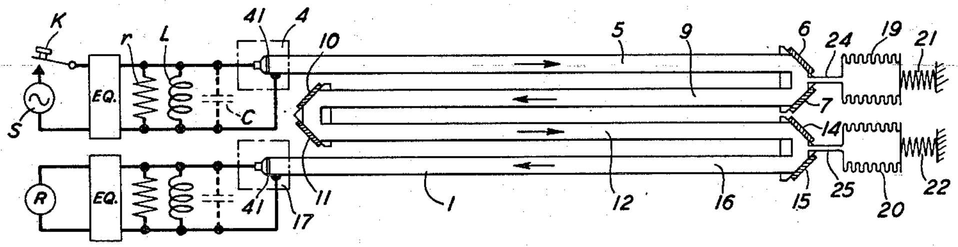
Fig. 1 is a schematic drawing showing the arrangement of the folded delay line.

Referring for a detailed description to the drawings, Fig. 1 shows schematically the layout of the folded line assembly 1. An electrical impulse to be delayed is applied at the transmitting crystal head 4 where it is converted into mechanical vibrations. These vibrations are propagated through mercury-filled tube 5 to end reflectors 6 and 7, each of which deflect at 90 degrees. They then travel through mercury-filled tube 9 to a second pair of end reflectors 10 and 11 which produces a further 180-degree reflection sending the vibrations through mercury-filled tube 12. A third set of reflectors 14 and 15 directs the vibrations back through mercury-filled tube 16 to the receiving crystal head assembly 17. The mechanical impulse there is converted back into varying electrical potentials and applied to the output circuit in form identical with those originally supplied but delayed by the length of time required for the mechanical vibrations to pass through the mercury column.

The circuits associated with the crystals are schematically indicated. The carrier wave source S which may supply a pulsed carrier wave, by use of means symbolically shown as a key K, is connected between the crystal 41 of terminal 4 and tube 5. The crystal has an inherent capacity C, shown in dotted outline, which is resonated with an inductance L at the carrier frequency and the resonant circuit is provided with a damping resistance $r$ to give the desired band width. The receiver R is shown connected by a similar intermediate circuit to the crystal 41 and line 16 in receiving terminal 17.

In order to insure that the column of mercury fills the tubes completely or that there is otherwise adequate contact with the crystal faces, an auxiliary supply of mercury is contained in Sylphon bellows 19 and 20 which are kept under pressure by suitably anchored springs 21 and 22. The importance of maintaining proper contact between the crystal faces and the mercury and between the mercury and the walls of the tubes will be discussed in greater detail hereafter. For the present it is sufficient to say that proper contact is secured by such connection of auxiliary supplies of mercury to the tubes through conduits 24 and 25, regardless of pressure or temperature variations, and of inclination of instrument at either end.

Figure 2:
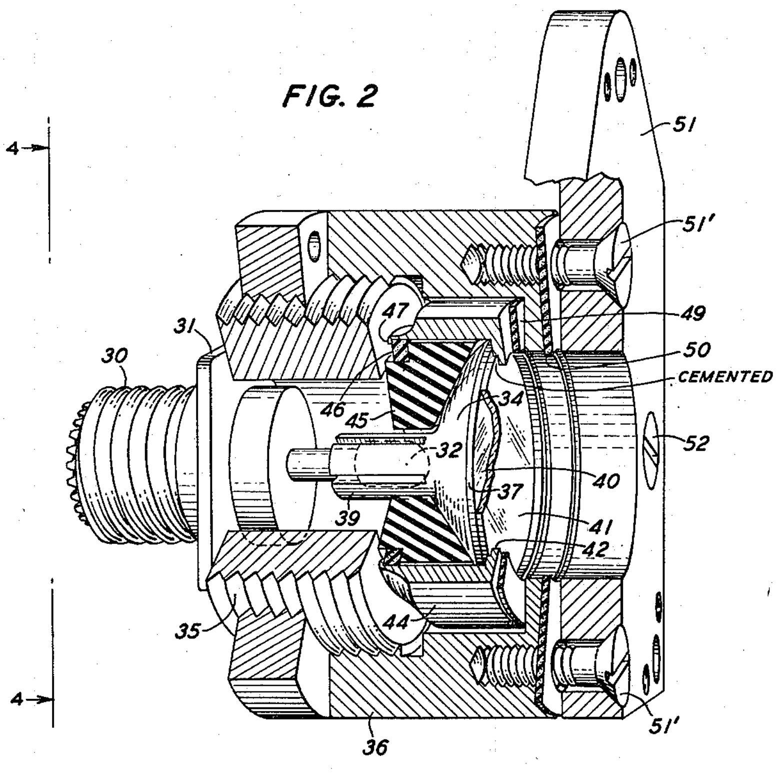
Fig. 2 is a perspective view of one of the crystal head units, detached from the assembly, and shown partially broken away and in section to show the details of construction more clearly.
Figure 4:
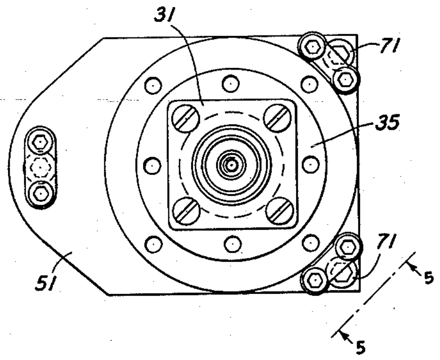
Fig. 4 is an end view of one of the assembled crystal head units looking in the direction indicated by line 4—4 of Fig. 2.
Figure 5:
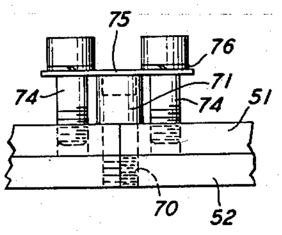
Fig. 5 is a detail view of a portion of the means for aligning the crystal, taken as indicated by line 5—5 of Fig. 4.

The construction of the crystal head assembly which permits the extremely precise adjustment and alignment of the crystals necessary to the proper use of such a line, is shown in Fig. 2. Castellated screw fitting 30 is provided for the reception of a coaxial line terminal or other connecting line. This connection element includes a mounting plate 31, and a plug 32 which is an extension of the central conductor of the coaxial line. Plug 32 is designed to fit slidably into a crystal backing member 34, and to provide good connection thereto while permitting angular movements during alignment of the crystal. The mounting plate 31 is secured fixedly to a screw plug 35 so that the entire crystal and its adjusting support members may be removed as a unit from the housing 36 which is secured to the line assembly 1, in such fashion as to be accurately adjustable relatively thereto, by means to be described in detail hereafter. The crystal backing member 34 comprises a hemispherical metal support 37 from the rear of which project slotted resilient contact fingers 39, which directly engage with the plug 32. Opposite fingers 39, the hemispherical support has a planar face 40 with which the flat circular crystal 41 is held in contact by a flange 42, projecting inwardly from an annular member 44. Member 44 surrounds a hard rubber ring 45, which presses against the hemispherical portion of the crystal support 37 and is sealed thereto by means of a washer 46, over which is crimped a thin edge portion 47, of the annular member 44. The assembly inclosed by the annular member 44 is sealed by means of an annular gasket 49 against the housing 36 under a pressure against the back of rubber ring 45 produced and controlled by the screw plug member 35. Due to the hemispherical shape of the portion 37 of the backing member 34, the conical shape of the rubber ring 45 which fits thereover, and the motion of the member 34 permitted by the resilient fingers 39, if the face 40 tends to exert non-uniform pressure on the crystal 41 the member 34 will reseat itself in such a way as to exert uniform pressure upon the back of the crystal 41 over the area of contact. This feature prevents cracking the crystal 41 as the plug 35 is screwed into place. The housing 36 is in turn sealed to the tube assembly by means of a flexible gasket 50, compressed between housing 36 and base plate 51, by screws 51'. Base plate 51 is secured to end plate 52 by means providing the precise alignment which are shown in Figs. 4 to 6 and will be described in detail hereafter.

Figures 3, 8:
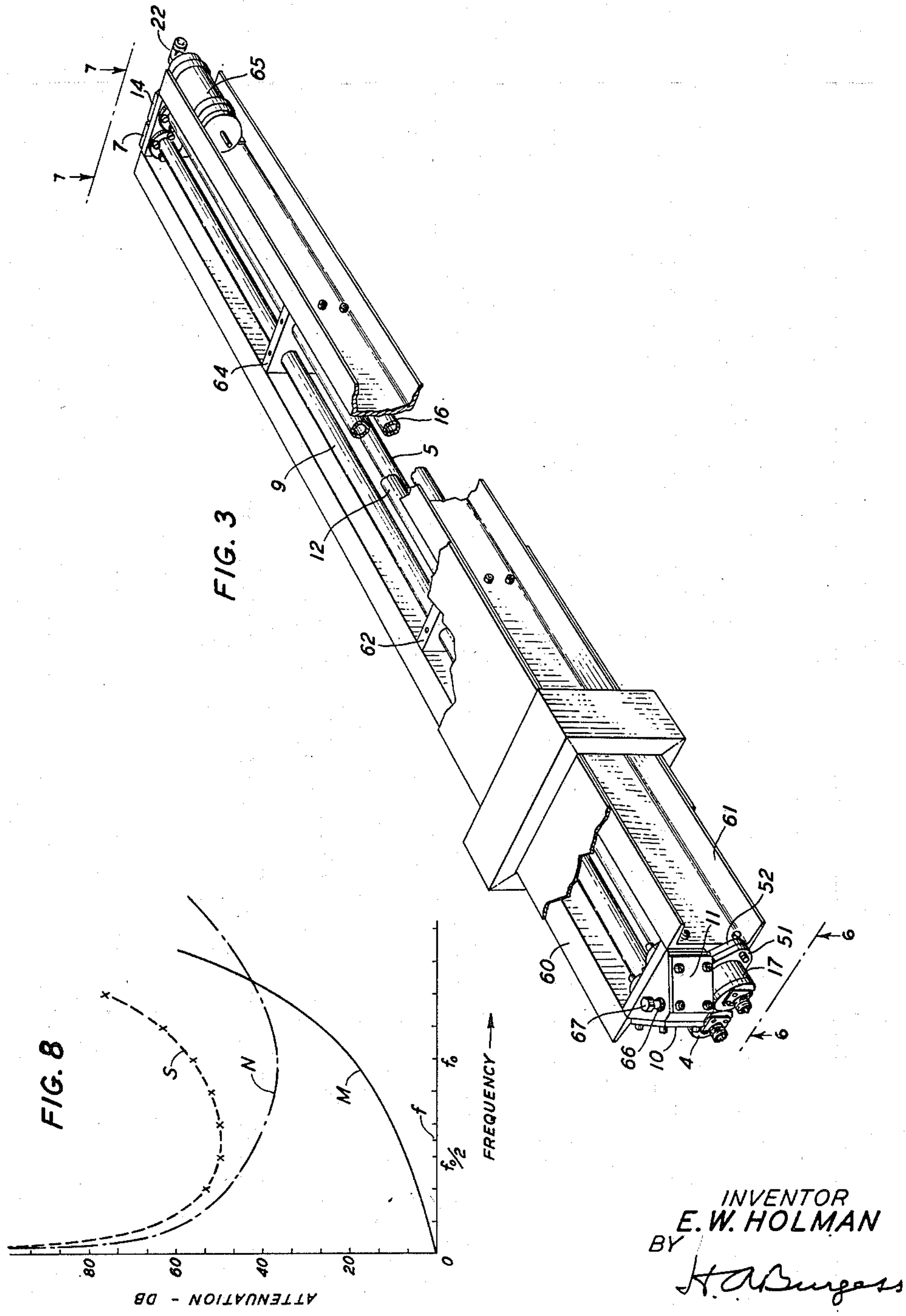
Fig. 3 is a perspective view showing a complete folded delay line unit.
Fig. 8 shows graphs of transmission characteristics to be referred to in the description.

Fig. 3 shows the construction of the assembly shown schematically in Fig. 1 in greater detail. Two channel beams 60 and 61 are used to provide the necessary support for the tube assembly. These channel beams are suitably secured at their ends and are provided with transverse members 62 and 64, in order to support the tubes rigidly. It should be recognized that the mass of the mercury filled pipes is considerable and that when a pipe of 6 feet in length is used, it is very necessary to provide support intermediate its ends or else there will be sufficient sag to cause spurious impulses to be observed at their receiving end. The tubes 5, 9, 12, 16 are in the preferred embodiment of my invention constructed as stainless steel pipes having an internal diameter of one inch. For stationary use such tubes may be in some cases sufficiently self-supporting, but where it is contemplated that they will be subjected to rough handling provision must be made for suitable support. The transmitting and receiving crystal end assemblies 4 and 17 are shown in the left foreground of Fig. 3. At the opposite end are seen the reflectors 7 and 14, while directly above the crystal heads are seen the reflectors 10 and 11. Opposite the head assembly is seen the housing 65 in which is included a Sylphon bellows 20, provided for the maintenance of the mercury supply.

In connection with reflectors 10 and 11, a bleeding aperture 66, closed by a screw plug 67, is provided in order to permit the release of occluded gases. Bleeders are likewise provided in the fittings adjacent reflectors 7 and 14 and the Sylphon bellows 19 and 20. Aperture 66 is also used for filling the line with mercury.

Figure 6:
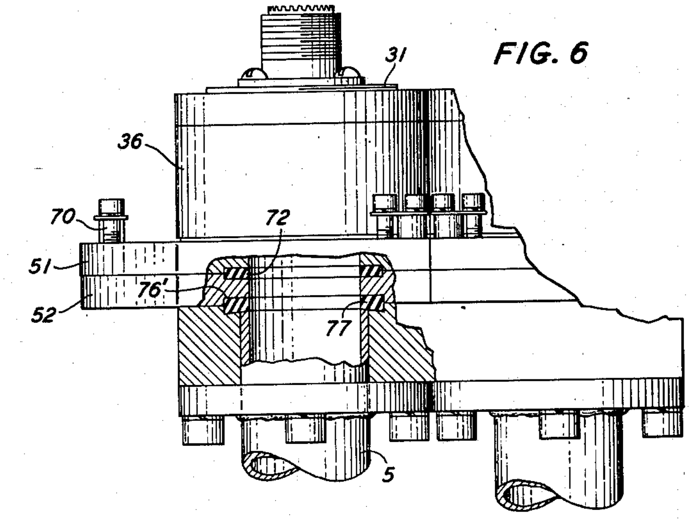
Fig. 6 is a fragmentary view of the end assembly, taken as indicated by line 6—6 of Fig. 3, and partially broken away to show details of the seals between the head unit and the tube.

The means for adjusting and aligning the crystal head units precisely will next be considered in connection with Figs. 3 to 6 inclusive. The base plate 51 has been described as secured to the end plate 52 by screws (see Fig. 6). This is accomplished by means of screws 70 which are conveniently provided with socketed heads 71. The base plate 51 is clamped against end plate 52 with an annular gasket of resilient material 72. This material must be of the type which is not affected by contact with mercury and affords a seal about the junction between the crystal head unit and the first pipe 5. A slight space is left between end plate 52 and base plate 51 which permits the latter to be adjusted relative to the former about the gasket as a pivot by means of the adjusting screws 70. This adjustment may need to be as slight as of the order of .00001 of an inch and it is important that, once made, it shall not change. In order to prevent vibration from loosening the screw 70, two adjusting bolts 74 are mounted adjacent the socketed head 71, and are used to hold a cover plate 75, against the socketed head 71. Conventional lock washer 76 may be used to prevent the adjusting bolts 74 from changing their position. It is recognized that other equivalent means may be used to secure the positioning bolt 70 in place. It should be noted however, that when lock washers have been used with this bolt directly, strains have been set up in the base plate such as to throw the crystal heads out of alignment. Hence I find it desirable to provide some method of maintaining the adjustment of the positioning bolts which will not introduce warping or distortion in the end plate or base plate, and this can be done by the introduction of a suitable lock either rigid or frictional which may be readily removed to permit readjustment of the crystal head. In Fig. 6 is seen also the joint between the tube 5 and the end plate 52. A washer 77, of resilient material, is likewise used here with special provision to insure complete sealing. The annular channel 76′ into which the gasket 77 is fitted is shaped in cross-section like a keystone or wedge so that the gasket material will be forced completely into intimate contact with the material during assembly and there will be no possibility of leakage in case some shrinkage of the gasket material is experienced.

Figure 7:
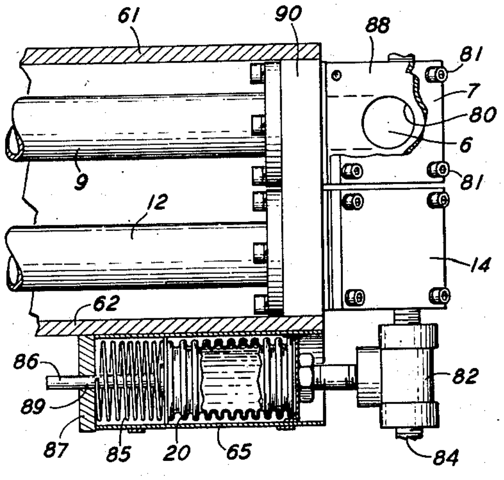
Fig. 7 is a top view, taken as indicated by line 7—7 of Fig. 3, and partially broken away to show details of the end reflectors and Sylphon bellows.

The details of the Sylphon bellows arrangement 20 for maintaining a constant supply of mercury are shown in Fig. 7. In this figure a top view is shown partially broken away to permit easier inspection of the details of construction. Tube 9 receive vibrations from the tube 5 therebeneath, not visible in the figure, through the end reflectors 6 and 7. The reflector 7 is broken away so that the vertical channel bore 80 may be seen closed at its lower end by the reflector 6. The construction of these end reflectors is preferably of steel. The end reflectors 6 and 7 are held removably by means of socket head bolts 81. They may be taken off for inspection or cleaning of the interior. It should be noted that the bore 80 consists of three separate passageways machined in the solid block 88. A bore must be provided in continuation of each of the pipes 5 and 9 together with a bore at right angles to both of them. The passage thus formed communicates with the Sylphon bellows 20 through a T-shaped fitting 82, provided with a bleeder plug 84. The bellows assembly is enclosed in a housing 65 and includes a spring 85 plus a stub shaft 86, which acts to maintain the axial alignment of the bellows by virtue of its slidable positioning in housing end 87 through a suitable bore 89. These bellows are of the conventional Sylphon type which consist of a flexible corrugated metal which may be extended or compressed freely without danger of breaking a seal. If the mercury in the line contracts due to cold, the spring 85 compresses the bellows 20 and flows additional mercury into the line. If the temperature becomes high the mercury in the line expands back into the bellows against the pressure of the spring 85. It is necessary to provide a certain amount of pressure in spring 85 in order to prevent the formation of air bubbles or pockets which might otherwise occur.

In assembling the line the tubes and the end assemblies at the reflecting points are put together in the manner generally indicated in the drawings but without any fluid filling initially. The reflecting plates at the folds, that is, 6, 7; 10, 11 and 14, 15 are left off and in their places are bolted a corresponding number of optically flat mirrors. The crystal mounting assemblies including housings 36 and plates 51 are likewise left off and small optical apertures are provided in their stead at the end of the pipes 5 and 16. Light is projected through one of these apertures and the image of the aperture is observed at the opposite terminal of the line. Adjustments are made to the extent necessary to secure precise centering of the image, by placing shims between the head block 90 and the block 88 (Fig. 7) supporting the mirrors. By this procedure accurate axial alignment of the entire line is achieved. If necessary the alignment can be accomplished in steps by using the optical test on two lengths of the line at first, then on three lengths and so on.

After the optical test has been completed and the adjustments made in connection with it, the mirrors are replaced by the reflecting steel plates and the crystal mounting heads are secured to the two ends of the line. Mercury is then poured into port 66, with the bellows 65 held at its mid-position by substituting a block for the spring 85. By tilting the line slowly back and forth the air can be made to accumulate at the end of the line where the port 66 is located and can thus be removed. Alternatively, the entire line can first be evacuated to a pressure of a few millimeters and thereafter the mercury can be distilled into the line through the port 66 until the line is entirely filled. The latter method, since it removes the occluded air in the mercury, has certain advantages which show up in connection with the use of the line such as making it more immune to mechanical shock and vibrations in the line, which when present have the effect of increasing the attenuation of the line for the transmission of the desired waves. However, to assist in achieving proper reflection at the reflector plates, it is desirable to introduce a microscopically thin layer of air, which may be held on the surface of the plate merely by occlusion. When the line is filled under vacuum, one way to provide such air films on the faces of the reflector plates is to stand the line on end after it has been filled, allow the bellows 65 to expand somewhat and remove the reflector plates at the end of the line that is uppermost. This permits air to enter. The plates are replaced when the level of the mercury is brought close to the plane that is to be occupied by the reflecting plates and the plates are then bolted in place. Lap grinding can be used on the face of each plate adjacent the mercury to promote formation of an air film. Lap grinding is also of advantage on the face of the backing plate 34 for the crystal 41 to increase the mismatch of impedances and promote reflection. If it is not desired that the line be opened and exposed to the air, a sheet or film of paper or other low impedance material may be used to cover the steel plate.

With the line finally assembled and filled, the spring 85 is restored in the bellows chamber so as to hold the mercury in good physical contact with all inner surfaces of the line including crystal faces and reflector plates.

Test pulses of the high frequency carrier wave are now sent through the line and by means of an oscilloscope and known type of testing circuit a comparison is made between the shape of the pulse when transmitted through the mercury line and the shape of the pulse when transmitted through a distortionless line which may conveniently be in the form of a calibrated attenuating circuit. It is quite likely that the pulse form at first observed will not be the best obtainable. This is because of the difference in conditions obtaining when the line was empty, as it was when the optical tests were made, and when it has been filled with the fluid especially in the case of mercury which is very heavy. This is where the adjustable feature of the crystal heads according to the invention is of great advantage for it is only necessary to adjust the bolts 70 to produce micrometer shifts in orientation of the crystal heads, the yielding washer 72 allowing such movements to be made without disturbing the rest of the line or introducing strains into the crystals or their mountings or into any other part of the line. The procedure is to make slight adjustments in the crystal heads while observing the pulse shape on the oscilloscope. The adjustments are continued until the received pulse shape is the most perfect replica of the transmitted pulse obtainable.

The shape of the received pulse depends markedly upon the over-all band width of the line and crystal. The band width at relatively low frequency is primarily determined by the crystal resonance but since the line attenuation increases approximately as the square of the frequency, it becomes controlling at high frequencies from the standpoint of band width distortion. The line and crystal characteristics for one particular line are given in Fig. 8 by the curves M and N respectively, the overall characteristic being given by the summation curve S. Operating the line at high frequencies means acceptance of increased attenuation or line loss but allows broader frequency bands to be used since crystals have broader resonance bands at high frequencies than at low frequencies. Although the summation curve S of Fig. 8 is sloped and has curvature, these effects can be largely compensated by use of suitable equalizers in the external circuits connected to the crystals. Two such equalizers are designated EQ in Fig. 1.

The frequency $f_0$ is the resonant frequency of the crystal. Frequency $f$ is what may be termed optimum operating frequency since it represents the point of minimum over-all attenuation as given by curve S. Operation at frequency $f$ may give such low attenuation that the standing waves become troublesome in which case it may be advantageous to operate at some higher frequency such as at $f_0$. This is generally at the sacrifice of some band width since the slope across the band is not symmetrical on both sides of $f_0$ and is therefore difficult to equalize. Greater band width without equalization is available by operating at frequency $f$.

What is claimed is:

1. In a signaling system, apparatus for reproducing in an output circuit a signal pulse which is a replica of an input circuit signal pulse and delayed with respect thereto which comprises an angularly folded conduit, a reflector at each angular fold of such conduit, a piezoelectric crystal driver element at the head of said conduit, a piezoelectric crystal receiver element at the other end of said conduit, a low-loss high impedance liquid substantially filling said conduit, both faces of said crystals adjacent said liquid being highly polished to provide intimate contact therewith, a backing plate adjacent the rear face of each of said crystals, the texture of the surface of said backing plate adjacent said crystal being adapted to increase the mismatch of impedances and promote reflection of compressional waves, and means for maintaining constancy of hydrostatic pressure of said liquid for all positions of said conduit.

2. In a delay transmission line comprising a fluid-filled tube of relatively great length, a piezoelectric crystal at an end of said tube for converting impressed electrical pulses into mechanical pulses in said fluid, and a backing plate for said crystal, said crystal having a sufficiently high resonant frequency to possess the band width necessary to transmit the pulses true to form, said frequency being sufficiently high that standing waves in said line are not troublesome, said crystal having a thickness of half a wavelength at the resonant frequency, and the side of said backing plate facing said crystal having good reflecting properties.

3. A system according to claim 2 in which the impressed electrical pulses are pulses of high frequency carrier waves, the carrier frequency coinciding with the resonant frequency of said crystal.

4. A system according to claim 2 in which the optimum operating frequency is different from the resonant frequency of said crystal and in which the impressed electrical pulses are in the form of pulses of high frequency carrier waves, the carrier frequency being substantially at the optimum operating frequency of the system.

5. Apparatus in accordance with claim 1 which includes means for equalizing the pressure between each of said crystals and its associated backing plate over the area of said crystal.

6. Apparatus in accordance with claim 1 in which said liquid is mercury which contains substantially no occluded air.

7. A delay line in accordance with claim 2 which includes means for maintaining within said tube a hydrostatic pressure greater than atmospheric pressure for all positions of said line.

8. A delay line in accordance with claim 2 which includes means for equalizing the pressure between said crystal and said plate over the area of said crystal.

9. In a delay line of the type comprising a folded tube filled with liquid, piezoelectric crystals at the respective ends thereof, and an acoustically reflecting plate at the fold of the tube, the method of axially aligning the delay line which comprises removing the liquid, substituting for the crystals small optical apertures centered at the respective ends of the line, substituting an optically flat mirror for the plate, projecting a beam of light through one of the apertures, and adjusting the plane of the mirror until the beam emerges from the other aperture.

10. In combination, a container, liquid filling said container, an aperture in said container, a piezoelectric crystal closing said aperture from the outside, a backing plate in contact with said crystal over substantially the entire outer face thereof, a resilient member contacting said plate, and adjustable means for exerting pressure upon said member to force it against said crystal, the back of said backing plate being hemispherical in shape, and said member being conical in form on the side facing said backing plate.

ERWIN W. HOLMAN.

REFERENCES CITED

The following references are of record in the file of this patent:

UNITED STATES PATENTS

| Number | Name | Date |
|---|---|---|
| 2,013,415 | Marden | Sept. 3, 1935 |
| 2,016,247 | Simmons | Oct. 1, 1935 |
| 2,263,902 | Percival | Nov. 25, 1941 |
| 2,284,088 | Gerber | May 26, 1942 |
| 2,423,306 | Forbes et al. | July 1, 1947 |
| 2,426,663 | Bevins | Sept. 2, 1947 |
| 2,446,835 | Keary | Aug. 10, 1948 |
| 2,460,153 | Smoluchowski | Jan. 25, 1949 |
| 2,498,737 | Holden | Feb. 28, 1950 |
| 2,505,364 | McSkimin | Apr. 25, 1950 |
| 2,512,156 | Hoffman | June 20, 1950 |
| 2,558,012 | Star | June 26, 1951 |